United States Patent
Moeller et al.

(10) Patent No.: US 6,214,395 B1
(45) Date of Patent: Apr. 10, 2001

(54) LIQUID SMOKE BROWNING AGENT SOLUTION

(75) Inventors: Patrick W. Moeller; Sreekumar Ramakrishnan, both of Brentwood, TN (US)

(73) Assignee: Hickory Specialties, Inc., Brentwood, TN (US)

( * ) Notice: Subject to any disclaimer, the term of this patent is extended or adjusted under 35 U.S.C. 154(b) by 0 days.

(21) Appl. No.: 09/425,147

(22) Filed: Oct. 21, 1999

(51) Int. Cl.[7] .............................. A23L 1/232; A23L 1/275
(52) U.S. Cl. ..................... 426/314; 426/315; 426/533; 426/540; 426/650; 426/655
(58) Field of Search ................................ 426/314, 315, 426/533, 540, 650, 655

(56) References Cited

U.S. PATENT DOCUMENTS

| | | |
|---|---|---|
| 3,106,473 * | 10/1963 | Hollenbeck . |
| 4,298,435 * | 11/1981 | Ledford . |
| 4,431,032 | 2/1984 | Nicholson . |
| 4,500,576 | 2/1985 | Nicholson et al. . |
| 4,511,433 | 4/1985 | Tournier et al. . |
| 4,511,613 | 4/1985 | Nicholson et al. . |
| 4,540,613 * | 9/1985 | Nicholson et al. . |
| 4,717,663 | 1/1988 | Minoshima et al. . |
| 4,744,926 | 5/1988 | Rice . |
| 4,751,097 * | 6/1988 | Melcer . |
| 4,876,108 * | 10/1989 | Underwood et al. . |
| 4,952,751 | 8/1990 | Blume et al. . |
| 4,994,297 | 2/1991 | Underwood et al. . |
| 5,039,537 | 8/1991 | Underwood . |
| 5,223,601 | 6/1993 | Chum et al. . |
| 5,252,188 | 10/1993 | Stradal et al. . |
| 5,270,067 | 12/1993 | Underwood et al. . |
| 5,292,541 | 3/1994 | Underwood et al. . |
| 5,395,455 | 3/1995 | Scott et al. . |
| 5,582,682 | 12/1996 | Ferretti . |
| 5,637,339 | 6/1997 | Moeller . |
| 5,646,045 | 7/1997 | Ang . |
| 5,656,315 | 8/1997 | Tucker et al. . |
| 5,681,603 | 10/1997 | Underwood . |
| 5,769,934 | 6/1998 | Ha et al. . |

FOREIGN PATENT DOCUMENTS

| | | |
|---|---|---|
| 2301103 | 11/1996 | (GB) . |
| WO 95/04857 | 2/1995 | (WO) . |

OTHER PUBLICATIONS

Westvaco Corporation, "Material Safety Data Sheet" for Pinnacle Prime bleached hardwood pulp.

* cited by examiner

Primary Examiner—Cynthia L. Nessler
(74) Attorney, Agent, or Firm—Jenkins & Wilson, P.A.

(57) ABSTRACT

A liquid smoke browning agent solution having good browning but minimal or no flavor, and a related method for making same. The liquid smoke browning agent solution may be made from commercially existing delignified wood pulp.

12 Claims, No Drawings

LIQUID SMOKE BROWNING AGENT SOLUTION

TECHNICAL FIELD

The present invention relates, in general, to a liquid smoke composition. Such liquid smoke compositions are used to color and flavor edible foodstuffs. More particularly, the present invention relates to a liquid smoke browning agent solution, and especially such a solution having minimal or no flavoring characteristics.

Table of Abbreviations

| | |
|---|---|
| avg | average |
| C. | Centigrade |
| F. | Fahrenheit |
| g | gram |
| kg | kilogram |
| mg | milligram |
| ml | milliliter |
| mm | millimeter |
| min | minute |
| NA | no aroma |
| NaOH | sodium hydroxide |
| SI | stain index |

BACKGROUND OF THE INVENTION

Liquid smoke compositions (also known as liquid smoke solutions, and colloquially referred to as liquid smokes) were developed from pyrolysis of hardwood sawdust as a replacement for smoking of food by direct contact with smoke in a smokehouse. Liquid smoke compositions have become a standard industry practice.

Liquid smoke compositions, when applied to the surface of meats, such as various types of sausages, frankfurters, bolognas, beef rolls, hams, and the like, and other proteinaceous foodstuffs, provide a smokey flavor and a dark smoke color to the foodstuff, achieving a smokehouse-like product. Nevertheless, this requires control and balancing of many variables such as the food composition, temperature, humidity, processing time, contact time, amount of liquid smoke, and concentration of liquid smoke.

As is well known to those skilled in the art, liquid smoke compositions obtained from pyrolysis of hardwood sawdust contain constituents primarily from the thermal degradation of cellulose, hemicellulose, and lignin. More particularly, the liquid smoke compositions contain a wide array of over 400 chemical compounds, and hence, liquid smoke compositions are characterized by their content of certain classes of compounds, namely, acids (% titratable acidity), phenols, and carbonyls.

The acids are preservatives and pH control agents. Commercial liquid smoke compositions typically have a pH under about 2.5, and more typically under about 2.3, and a % titratable acidity by volume from about 3% to about 18%.

The phenols give a smokey flavor, and also aroma, to liquid smoke compositions, which typically have a phenols content from about 10 to about 45, and more typically, from about 14 to about 30 mg/ml. The carbonyls impart the brown color to liquid smoke compositions. The phenols and the carbonyls can be measured as described in U.S. Pat. No. 4,431,032 issued Feb. 14, 1984 to Nicholson, assigned to Union Carbide Corporation, which describes techniques for the removal of an undesirable tar component from liquid smoke compositions. Also, the browning potential of liquid smoke compositions can be measured by the well-known in the art Browning Index procedure described in U.S. Pat. No. 4,994,297 issued Feb. 19, 1991 to Underwood, assigned to Ensyn Engineering Associates, Inc., (which describes general background on techniques for the manufacture of liquid smoke compositions including the technique of fast pyrolysis of wood or cellulose), or by the well-known in the art Stain Index procedure involving reaction of liquid smoke with glycine. It is noted that the acids and carbonyls are secondary in contributing to the smokey flavor of liquid smoke compositions.

As the advent of liquid smoke compositions has significantly improved meat processing, attempts have been made to create a liquid smoke product that can impart browning to a foodstuff, but impart minimal or no flavoring. Thus, the foodstuff treated with such a liquid smoke browning would look like a smoked foodstuff, i.e., have a roasted, conventional oven-cooked look, even though the treated foodstuff would not taste smokey like a smoked foodstuff but rather retain its original flavor or have a nondescript, conventional oven-roasted flavor.

Of more particular interest in relation to the present invention is the process of U.S. Pat. No. 5,292,541 issued Mar. 8, 1994 to Underwood et al., assigned to Red Arrow Products Company, Inc., which discloses a process for producing a liquid product for coloring and flavoring a foodstuff by pyrolyzing sugars and starches. The liquid product is useful for imparting a brown smoked color to a foodstuff without adding strong smoked flavors to the foodstuff.

Also, U.S. Pat. No. 5,270,067 issued Dec. 15, 1993 to Underwood et al., assigned to Red Arrow Products Company Inc., is a Continuation-in-Part of an application that matured into U.S. Pat. No. 5,039,537 issued Aug. 13, 1991 to Underwood, assigned to Red Arrow Products Company Inc., and '537 is a Continuation-in-Part of an application that matured into the above-noted '297. Both '067 and '537 disclose a high browning liquid composition made from sugar, starch, monosaccharide, disaccharide, trisaccharide, starch hydrolysate, cellobiose, hemi-cellulose and mixtures thereof ('067) or made from wood or cellulose ('537). Likewise U.S. Pat. No. 5,252,188 to Stradal et al., assigned to Red Arrow Products Company Inc., discloses a high browning liquid composition made from cellulose, wood, sugars, or starches.

Moreover, U.S. Pat. No. 5,395,455 issued Mar. 7, 1995 to Scott et al., assigned to Energy, Mines and Resources—Canada, discloses a process for the production of anhydrosugars from lignin-containing and cellulose-containing biomass by pyrolysis. Significantly, not only is the material that is subjected to pyrolysis not delignified, but also, there is no disclosure of the use of a produced anhydrosugar as a browning agent.

Additionally, U.S. Pat. No. 5,769,934 issued to Ha et al. on Jun. 23, 1998, assigned to FMC Corporation, discloses a representative method for producing microcrystalline cellulose which includes subjecting a cellulose source material to steam explosion treatment. Microcrystalline cellulose is disclosed as being a well-known material that finds widespread use in pharmaceuticals and in foods, e.g., as a stabilizer or fat replacement. There is no disclosure of the preparation of a browning agent from the microcrystalline cellulose material.

Furthermore, U.S. Pat. No. 4,744,926 issued May 17, 1988 to Rice, assigned to Vitamins, Inc., discloses a process for extracting liquids from solids, including the extraction of colors, flavors and essences from roots, bark, leaves, flowers, and seeds. However, there is no disclosure of the production of a liquid browning agent from a delignified pulp, such as a hardwood material.

Moreover, of background interest, U.S. Pat. No. 4,511, 613 issued Apr. 16, 1985 to Nicholson et al., assigned to Union Carbide Corporation, and U.S. Pat. No. 4,500,576 issued Feb. 19, 1985 to Nicholson et al., assigned to Union Carbide Corporation, each discloses a process and composition for inhibiting formation of discoloration and black spots on a cellulose food casing treated with liquid smoke. Each patent discloses the contacting of the food casing with an agent having the ability to prevent the progressive oxidation of metals, a noted cause of discoloration. The disclosed liquid smoke is derived from natural wood.

Additionally, U.S. Pat. No. 5,866,526 issued Feb. 2, 1999 to Olsen et al., assigned to Novo Nordisk A/S, discloses an enzyme preparation made from a modified enzyme selected from the group consisting of an amylase, lipase, oxidoreductase, pectinase, or hemicellulase. The enzyme preparation is disclosed as potentially useful in human food applications including baking, beer brewing, and juice preparation, and also in the preparation of animal feed. Thus, while this patent discloses the enzyme, hemicellulase, for use with food, nothing is disclosed vis-a-vis delignified wood pulp.

Lastly, of background interest is U.S. Pat. No. 5,681,603 issued Oct. 28, 1997 to Underwood, assigned to Red Arrow Products, which discloses making a coloring/flavoring composition by contacting water insoluble tar by-product (from liquid smoke) with an alkaline solution to an end pH above 10, and then with certain non-ionic aromatic hydrocarbon-based resins.

The disclosures of all of the above-mentioned patents are incorporated herein by reference.

Nevertheless, problems still exist with attempts to obtain a browning agent that does not impart flavor characteristics even though the literature on biomass pyrolysis indicates that the phenols are essentially a product of lignin degradation while the acids and carbonyls are obtained from degradation of cellulose and hemicellulose.

Surprisingly, the present inventors have discovered how to obtain browning/coloring solutions of low phenol and acid content relative to carbonyls content (which solutions provide for high stain/browning- low/altered flavor solutions) by pyrolysis of delignified hardwood pulp.

SUMMARY AND OBJECTS OF THE INVENTION

Accordingly, the present invention provides a method for making a liquid smoke browning agent solution. The method comprises the step of pyrolysing a delignified wood pulp. The pyrolysing produces a liquid smoke browning agent solution that possesses (i) a low phenols content that is incapable of imparting a smokey flavor to a foodstuff treated with the liquid smoke browning agent solution and (ii) a stain index sufficiently high to impart browning to a foodstuff treated with the browning agent solution.

Additionally, the present invention provides for a liquid smoke solution comprising a liquid smoke browning agent solution, which (i) possesses a low phenols content that is incapable of imparting a smokey flavor to a foodstuff treated with the liquid smoke browning agent solution and (ii) a stain index sufficiently high to impart browning to a foodstuff treated with the browning agent solution.

Preferably, the liquid smoke browning agent solution has a high stain index:phenols content ratio above about 10, more preferably above about 12.

Also, preferably, the liquid smoke browning agent solution has a low phenols content less than about 6.5 mg/ml, more preferably less than about 5.5 mg/ml.

The present invention also contemplates a food casing treated with the liquid smoke browning agent solution. The treatment may be by spraying the solution onto a surface of the casing, or in the event that the casing is of extruded polymeric plastic film, the solution may be sprayed onto a surface of the film or may be incorporated into the extruder with the polymeric resin beads and thus blended into the resultant plastic film.

The present invention also contemplates a proteinaceous meat foodstuff, such as various types of sausages, frankfurters, bolognas, beef rolls, hams, and the like, treated with the liquid smoke browning agent solution.

Accordingly, it is an object of the present invention to provide a liquid smoke browning agent solution and related method of manufacture, wherein the solution will impart browning but will not impart flavor (or impart only minimal flavor, i.e., a nondescript, conventional oven-roasted flavor but not a smokey flavor) to a foodstuff treated with the solution.

Hence, it is an advantage of the present invention that a foodstuff treated with the liquid smoke browning agent solution of the present invention obtains a conventional oven-roasted nondescript flavor or retains its original flavor and does not taste smokey like a smoked foodstuff.

Thus, it is another advantage of the invention that non-meat proteinaceous foodstuffs that are not typically treated with liquid smoke, such as baked dough products, because they are the kinds of foodstuffs for which it is undesirable to have a smokey flavor, can be treated with the inventive liquid smoke browning agent solution to impart browning.

Furthermore, it is a feature of the present invention that meat foodstuffs treated with the inventive liquid smoke browning agent solution may be cooked in a microwave oven, which ovens are well known not to impart browning to meat, and yet the microwave oven-cooked meat will look browned as if roasted in a conventional oven.

Some of the objects, advantages, and features of the invention having been stated above, other objects, as well as other advantages, will become evident as the description proceeds, when taken in connection with the Laboratory Examples and detailed description below.

DETAILED DESCRIPTION OF THE INVENTION

The present invention is directed to a liquid smoke browning agent solution manufactured by pyrolysing a delignified wood pulp. After pyrolysis, water is employed to condense the smoke vapor into the resultant liquid smoke browning agent solution of the invention. The liquid smoke browning agent solution imparts minimal or no flavor to a foodstuff treated with it, by which is meant it may impart a nondescript, conventional oven-roasted flavor but is incapable of imparting a smokey flavor. The liquid smoke browning agent solution has a low phenols content preferably under about 6.5, more preferably under about 5.5, and even more preferably under about 5.0, and most preferably under about 4.5 mg/ml. Moreover, the resultant liquid smoke browning agent solution of the invention possesses excellent browning capability, and typically has a stain index:phenols content ratio of at least about 10.

The delignified wood pulp may be hardwood, softwood, or a combination thereof.

In several of the Laboratory Examples below, in order to produce a liquid smoke browning agent solution, a delignified wood pulp treated by the method of the present invention was PINNACLE prime breached hardwood pulp as the starting material. PINNACLE is commercially available from Westvaco, Wickliffe, Ky. Other commercially available wood pulps also may be employed as the starting material with the method of the present invention to produce a liquid smoke browning agent solution, as long as the starting-material is delignified. Alternatively as long as the manufacturing facility has the appropriate equipment for delignification of wood pulp, the delignification may be performed in house at the same site as the pyrolysis.

With the present invention, the pyrolysis of the starting-material delignified wood pulp to produce a liquid smoke browning agent solution should be at a temperature of at least about 350° F. (about 177° C.), more preferably at least about 400° F. (about 204° C.), and optionally, may be under an inert gas blanket, i.e., a nitrogen blanket. Furthermore, the time of contact is not particularly long, and may depend on the amount of ingredients, as readily determined by the person of ordinary skill in the art. Batch processes, wherein the delignified wood pulp is placed in a conventional pyrolysis reactor may be employed.

Additionally, food casings may be treated with the inventive liquid smoke browning agent solution. In the event that the casing is the fibrous type, the treatment may be by spraying the solution onto a surface of the casing. Typical fibrous casings are cellulosic in nature. In the event that the casing is of extruded polymeric plastic film, the solution may be sprayed onto the surface of the film. Alternatively, the solution may be incorporated into the extruder with the polymeric resins beads and thus blended into the resultant plastic film. Typical polymeric plastic films include, but are not limited to, films of polymers selected from the group consisting of ethylene vinyl acetate, ethylene acrylic acid, ethylene methacrylic acid, linear low density polyethylene, very low density linear low density polyethylene (sometimes referred to as ultra low density polyethylene), and combinations of the polymers.

Furthermore, a meat proteinaceous foodstuff may be treated with the inventive liquid smoke browning agent solution, such as by spraying on the surface of the meat proteinaceous foodstuff. Examples of various types of meat proteinaceous foodstuffs include, but are not limited to, sausages, frankfurters, bolognas, beef rolls, roast beefs, turkey breasts, hams, and combinations of the meat proteinaceous foodstuffs. Also, examples of various non-meat proteinaceous foodstuffs, which are typically not treated with liquid smoke (as these are the types of foodstuffs for which a smokey flavor is undesirable), but that may be treated with the inventive liquid smoke browning agent solution (such as by spraying on the surface) include, but are not limited to, baked dough goods (i.e., bread rolls, biscuits, etc.).

LABORATORY EXAMPLES

In the Laboratory Examples below, the wood pulp (i.e., PINNACLE pulp) was sometimes in the form of pellets and was sometimes in the form of shredded pulp.

Additionally, in the Laboratory Examples below, the methods used to determine the phenols and the carbonyls are well known to those skilled in the art and are set out at columns 11 and 12 in the above-mentioned U.S. Pat. No. 4,431,032 to Nicholson. Also, in the Laboratory Examples below, the methods used to determine the staining index and the acid percent are well known to those skilled in the art, and are set out as follows:

STAIN INDEX (FOR DETERMINATION OF BROWNING POTENTIAL)

Reagent of 2.5% Glycine in 95% Acetic Acid. Slurry 2.50 gram of glycine (Eastman #445) with 5.0 ml distilled water in a 150 ml beaker. Add about 70 ml glacial acetic and heat on a steam bath, stirring occasionally to dissolve the glycine. Transfer to a 100 ml volumetric flask, cool to room temperature, and make to volume with glacial acetic acid which is used to rise the original beaker. Filter the solution prior to use if any glycine crystallizes out. The solution is stable for at least 3 weeks, and probably indefinitely.

5% Liquid Smoke Solution. Dilute 2.50 ml of liquid smoke to 50.0 ml with glacial acetic acid.

Reaction:
1. Using two 25 ml graduated test tubes, add 1.0 ml of the 5% liquid smoke solution to 10.0 ml of glycine reagent and add 1.0 ml of the 5% liquid smoke solution to 10 ml of glacial acetic acid (blank).
2. Cover each tightly with a square of parafilm, and mix by swirling and place in a water bath at 85° C. for 30 minutes.
3. Transfer each to a cold water bath and dilute partially with distilled water to speed cooling. When each is at room temperature, finish diluting each to the 25 ml mark and mix by inversion.
4. Set a spectrophotometer to 0 using distilled water. Read the absorbance of each solution in a 0.5 inch cuvette using a spectrophotometer at 440 millimicrons.
5. Calculate the net absorbance by subtracting the reading of the blank (consisting of 1.0 ml of 5% liquid smoke solution, 10.0 ml glacial acetic acid, and distilled water to 25 ml) from the reading of the test sample.
6. Calculate the stain index: SI=Net Absorbance×100.

PERCENTAGE OF ACETIC ACID

Pour 250 ml of distilled water into a clean 400 ml beaker. Introduce 6 ml of liquid smoke. Standardize pH meter with pH 7 buffer solution. The pH meter should be on 7.00. If not, use control knob and place it there. Rinse off glass electrode with distilled water from spray bottle. Place beaker of water-smoke mixture on testing platform, and lower pH electrodes. Stir mixture, adding in standard 1.0 Normality sodium hydroxide solution. Add the sodium hydroxide until pH meter reads 7.00. The amount of milliliters of sodium hydroxide put into the water-smoke mixture is the percentage of acetic acid.

For instance, 1 ml of NaOH solution entering into the smoke-water mixture will count 1 point acetic acid until the pH meter reaches a value of 7.00. In other words, if 9.4 ml of 1.0 N NaOH solution is introduced, the acetic acid reading will be 9.4% of acetic acid by volume. The calculations are as follows:

% acetic acid=[(ml of NaOH)×(Normality of NaOH)×0.1 (correction to %)×(equivalent weight of acetic acid)] divided by ml of liquid smoke.

% acetic acid=[(9.4 ml of NaOH)×(1.0 Normality)×(approximately 60)] divided by 6.0 ml of liquid smoke, and thus, % acetic acid=9.4.

Example 1 (pyrolysis under nitrogen blanket)

Each of 3 individual samples of shredded, delignified, hardwood pulp was loaded in a laboratory size stainless steel reactortube. It was then capped at both ends, and assembled into a process set-up. At one end, an inlet for a nitrogen supply was attached. Through the same end but with a different inlet, a thermocouple was introduced to measure the internal temperature. This thermocouple was connected to a temperature controller, which controlled the heat applied externally. The vapors from pyrolysis were swept under nitrogen (slight excess over atmospheric pressure) to a first and a second condenser.

The liquid condensates from the pyrolysis were recovered from the condensers and an intermittent connecting tube. The uncondensed gases were exhausted using the nitrogen sweep gas. The process conditions are summarized in Table 1A below.

TABLE 1A

| Sample | temperature setting ° F. (° C.) | weight of sample (g) | time (min) of pyrolysis* |
|---|---|---|---|
| 1 | 450 (232) | 148 | 20 |
| 2 | 500 (260) | 148 | 10 |
| 3 | 505 (262) | 150 | 30 |

*heat-up time of 45–60 min.

In Sample 1, the condensers and a part of the tube connecting the reactor to the condensers were filled with water. This resulted in a dilute aqueous solution. A portion of this dilute solution was concentrated in a rotary evaporator under conditions of a warm water bath (50° C.) and a vacuum of 8 to 10 mm of Hg.

In Sample 2, the first condenser (nearest to the reactor) had no water in it. The resulting solution was the condensate itself.

In Sample 3, the vapors were condensed in water. The analysis results for each of Samples 1, 2, and 3 are summarized in Table 1B below.

TABLE 1B

| Sample | acid (%) | stain index | Phenols content (mg/ml) | stain index/acid ratio |
|---|---|---|---|---|
| 1 | 0.7 | 6.4 | NA* | 9.1 |
| 2 | 0.8 | 23.9 | 1.2 | 29.8 |
| 3 | 0.2 | 3.5 | NA* | 17.5 |

*Minimal aroma was detected and thus although the phenol content was not measured, it was assuredly very low, i.e., under 0.1.

Example 2 (pyrolysis under atmospheric conditions)

For these samples, the pyrolysis was conducted under atmospheric conditions. No nitrogen gas sweep nor other inert gas was used. Each of 2 individual samples of PINNACLE shredded pulp was loaded in a 4-inch (10.2 cm) diameter, 14-inch (35.6 cm) long quartz rotary laboratory size kiln and placed in a heated tube furnace. The pyrolysis vapors were condensed in two vertical condensers. The first condenser was held at 149° F. (65° C.). The second condenser was held at 4 1° F. (5° C.).

The condensates from both condensers were mixed and diluted with an equal amount of water. Process details are presented in Table 2A below, and the analysis results of each aqueous solution after dilution are presented in Table 2B below.

TABLE 2A

| Sample | 1 | 2 |
|---|---|---|
| weight of sample (g) | 136.8 | 138.3 |
| temperature of pyrolysis ° F. (° C.) | 662 (350) | 887 (475) |
| time of pyrolysis (min) | about 7 | about 7 |
| moisture range (%) | 9 to 13 (avg. about 11) | 9 to 13 (avg. about 11) |
| weight of pyrolysis liquid (g) | 73.1 | 79.8 |

TABLE 2B

| Sample | 1 | 2 |
|---|---|---|
| acidity (%) | 2.2 | 2.9 |
| phenols content (mg/ml) | 3.7 | 4.1 |
| stain index | 46.1 | 48.2 |
| stain index/acid ratio | 21.0 | 16.6 |
| phenols/acid ratio | 1.7 | 1.4 |

Example 3 (pyrolysis under atmospheric conditions)

PINNACLE pellets were pyrolysed in a pilot plant under atmospheric conditions in a continuous rotary kiln typical of commercial liquid smoke production. The vapors were condensed in typical fashion using a water condensation system. Process conditions are set out in Table 3A below, and the analysis results are summarized in Table 3B below.

TABLE 3A

| Sample | 1 |
|---|---|
| feed processed pound (kg) | about 5500 (about 2500) |
| moisture range (%) | 9 to 13% (avg. about 11) |
| volume of finished product gallon (liter) | 247 (936) |

TABLE 3B

| Sample | 1 |
|---|---|
| acid (%) | 4.6 |
| pH | 1.87 |
| phenols content (mg/ml) | 5.2 |
| carbonyls (g/100 ml) | 19.8 |
| stain index | 86.0 |
| stain index/acid ratio | 18.7 |
| phenols/acid ratio | 1.2 |

Example 4 (comparison with commercial liquid smoke)

For comparison purposes, an analysis of regular liquid smoke obtained in a commercially standard pyrolysis process of hardwood and available under the trade name CODE 10 from Hickory Specialties, Inc. was as summarized in Table 4 below.

TABLE 4

(CODE 10)

| acid (%) | phenols content (mg/ml) | carbonyls (g/100 ml) | stain index | stain index/acid ratio | phenols/acid ratio |
|---|---|---|---|---|---|
| 10.8 | 17.8 | 20.5 | 91.6 | 8.5 | 1.6 |

Reviewing the analyses of the data from the laboratory size experiments in conjunction with the analysis of the data from the pilot plant, it is observed that the high stain index to acid ratio observed in the lab size experiments relative to that observed in commercial liquid smoke (CODE 10) was obtained in the pilot plant experiments as well as the laboratory size experiments. The phenols to acid ratio for the inventive liquid smoke browning agent derived from delignified pulp was typically lower than that for commercial liquid smoke (Code 10). That, together with the low phenols concentration relative to the stain index makes the inventive liquid smoke browning agent obtained from delignified wood pulp pyrolysis a unique (non-smokey flavor) solution with the ability to impart color via browning type reactions on suitable surfaces, as follows.

Example 5 (Treatment of Foodstuffs)

Various proteinaceous foodstuffs may be treated with the liquid smoke browning agent solutions from Example 1 (samples 1 through 3), Example 2 (samples 1 and 2), and Example 3 (sample 1).

The foodstuffs that may be treated by applying each of the liquid smoke browning a gent solutions to the surface of the foodstuffs are sausages, frankfurters, bolognas, beef rolls, roast beefs, turkey breasts, and hams, and also, baked dough products.

Excellent browning but no flavor, other than possibly a conventional oven-roasted nondescript flavor (not a smokey flavor), should be obtained.

Example 6 (Treatment of Food Casings)

Food casings may be treated with the liquid smoke browning agent solutions from Example 1 (samples 1 through 3), Example 2 (samples 1 and 2) and Example 3 (sample 1).

Selected casings may be cellulosic fibrous casings and may be treated by individually spraying each liquid smoke browning agent solution onto the surface of each respective casing.

Selected casings may be extruded polymeric plastic films and may be treated by individually spraying each liquid smoke browning agent solution onto the surface of each respective casing.

Selected casings may be extruded polymeric plastic films and may be treated by individually incorporating each liquid smoke browning agent solution with each respective kind of polymeric resin beads and thus blending each of the solutions into each of the resultant films.

The polymeric plastic films may be of ethylene vinyl acetate, ethylene acrylic acid, ethylene methacrylic acid, linear low density polyethylene, very low density linear low density polyethylene, and combinations thereof.

The untreated or treated foodstuffs of Example 5 are the same that may be packaged with the various casings, and the packaged foodstuffs should have excellent browning but no flavor, other than possibly a conventional oven-roasted nondescript flavor (not a smokey flavor).

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for making a liquid smoke browning agent solution comprising the step of pyrolysing a delignified wood pulp to produce a liquid smoke browning agent solution that possesses (i) a low phenols content that is incapable of imparting a smokey flavor to a foodstuff treated with the liquid smoke browning agent solution and (ii) a stain index sufficiently high to impart browning to a foodstuff treated with the liquid smoke browning agent solution.

2. The method of claim 1, wherein the wood pulp is selected from the group consisting of hardwood, softwood, and combinations thereof.

3. The method of claim 1, wherein the liquid smoke browning agent solution possesses a phenols content below about 6.5 mg/ml.

4. The method of claim 1, wherein the stain index:phenols content ratio is above about 10.

5. The method of claim 4, wherein the liquid smoke browning agent solution possesses a stain index:phenols content ratio above about 12.

6. The method of claim 1, wherein the pyrolysis is conducted at a temperature greater than about 350° F. (about 177° C.).

7. A method for making a liquid smoke browning agent solution comprising:

(a) delignifying a wood pulp, and (b) pyrolysing the delignified wood pulp to produce a liquid smoke browning agent solution that possesses (i) a low phenols content that is incapable of imparting a smokey flavor to a foodstuff treated with the liquid smoke browning agent solution and (ii) a stain index sufficiently high to impart browning to a foodstuff treated with the liquid smoke browning agent solution.

8. The method of claim 7, wherein the wood pulp is selected from the group consisting of hardwood, softwood, and combinations thereof.

9. The method of claim 7, wherein the liquid smoke browning agent solution possesses a phenols content below about 6.5 mg/ml.

10. The method of claim 7, wherein the stain index:phenols content ratio is above about 10.

11. The method of claim 10, wherein the liquid smoke browning agent solution possesses a stain index:phenols content ratio above about 12.

12. The method of claim 7, wherein the pyrolysis is conducted at a greater temperature than about 350° F. (about 177° C.).

* * * * *